United States Patent [19]

Hellar

[11] Patent Number: 5,251,382
[45] Date of Patent: Oct. 12, 1993

[54] TAPE MEASURE FOR DETERMINING THE CENTERPOINT OF A DISTANCE

[75] Inventor: James C. Hellar, East Sound, Wash.

[73] Assignee: Baklund-Hellar, Inc., East Sound, Wash.

[21] Appl. No.: 859,647

[22] Filed: Mar. 23, 1992

Related U.S. Application Data

[63] Continuation of Ser. No. 662,579, Feb. 28, 1991, abandoned.

[51] Int. Cl.⁵ ............................................. G01B 3/10
[52] U.S. Cl. ........................................ 33/759; 33/487; 33/494
[58] Field of Search ................. 33/494, 476, 755, 759, 33/486, 487, 492

[56] References Cited

U.S. PATENT DOCUMENTS

| Re. 11,450 | 10/1894 | Steck | 33/486 |
| 239,691 | 4/1881 | Appleton | 33/494 |
| 543,897 | 8/1895 | Schaer | 33/494 |
| 1,663,293 | 3/1928 | Cook | 33/494 |
| 2,569,202 | 9/1951 | Solomon | 33/2 R |
| 3,270,421 | 9/1966 | Jones | 33/759 |
| 3,289,305 | 12/1966 | Norton | 33/759 |
| 4,159,571 | 7/1979 | Jervis, Jr. | 33/494 |
| 4,247,986 | 2/1981 | Burroughs | 33/494 |
| 4,301,596 | 11/1981 | Sedlock | 33/494 |
| 4,484,395 | 11/1984 | Samuels | 33/494 |
| 4,490,921 | 1/1985 | Woods et al. | 33/494 |
| 4,499,666 | 2/1985 | Smith | 33/494 |
| 4,750,270 | 6/1988 | Kundikoff | 33/494 |

FOREIGN PATENT DOCUMENTS 408083  3/1910  France ................................. 33/494

Primary Examiner—William A. Cuchlinski, Jr.
Assistant Examiner—Alvin Wirthlin
Attorney, Agent, or Firm—Klarquist, Sparkman, Campbell, Leigh & Whinston

[57] ABSTRACT

A measuring tape is provided for quick determination of the center of a distance without requiring the calculation of the distance. The measuring tape includes two parallel edges and an ascending measuring scale along each edge printed on the same face of the tape and beginning at the same end of the tape. One of the scales has units calibrated to a conventional unit of length measurement. The second measuring scale has units calibrated to be exactly half the unit of the first scale.

6 Claims, 2 Drawing Sheets

TAPE MEASURE FOR DETERMINING THE CENTERPOINT OF A DISTANCE

This application is a continuation of application Ser. No. 07/662,579, filed on Feb. 28, 1991, now abandoned.

TECHNICAL FIELD

This invention is directed to the field of measuring devices. More particularly, this invention relates to measuring tapes.

BACKGROUND ART

Measuring devices such as the ruler or measuring tape have long been used to make determinations of distance. The devices usually consist of elongated strips of material having a straight measuring edge. Indicia of measured units of length are imprinted along the straight edge to allow the user of the device to make a direct visual reading of a linear distance when the edge of the device is laid adjacent to the measured dimension. The elongated strip may be manufactured of flexible or rigid materials. Flexible strips may be windable on a reel for ease of storage and conveyance. Wood, plastic, steel, and plastic-coated cloth are materials often used as strips. The indicia may be imprinted by chemical etching, stamping, silkscreening, photoengraving, or other means.

One application of the conventional yardstick or measuring tape is to determine the center of a linear distance. When using conventional measuring devices, this determination requires a computational step. The additional computational step consumes time and may result in error.

For example, it is often desirable to determine the location of the center of a wall in order to hang a picture. The width of the wall may be determined directly, using the measuring tape. However, to find the center of the wall, the width must now be divided in half. The division may be performed either mentally or by using a calculator. The resulting quotient is the distance between an end of the wall and its center. The center may finally be marked off by indexing the quotient on the scale of the measuring tape which is laid out adjacent to the measured dimension.

While the conventional ruler or measuring tape may be used effectively to determine a distance, it is an inefficient means of determining the centerpoint of that distance. Additional computational means, such as a calculator, pen and paper, or mental effort, must be employed. Therefore, a need exists for a measuring device that would simplify the determination of the centerpoint of a distance.

SUMMARY OF INVENTION

The present invention eliminates the computational step necessary to determine the centerpoint of a linear dimension. A measuring device is provided that has two scales along its longitudinal marginal edges. One of the scales, called the full scale, is properly calibrated to measure distances along the edge in conventional units, either English or metric system units or both. The other scale is the half scale. It has numerical indicia separated by intervals of exactly one-half the units of the first scale. Both scales begin on the same end of the measuring device and are preferably, but not necessarily, printed, engraved, or otherwise placed on the same side of the device. This eliminates a need to flip the device over.

The carpenter who must quickly determine the centerpoint of a beam for cutting need only complete a simple two step method. First, a number corresponding to the desired length of the beam is obtained by placing the device along the length of the beam and finding the indicia of the full scale closest to the desired end of the beam. Second, the distance from one of the ends to the center of the beam is identified using the half scale indicia corresponding to the indicia on the full scale which equals the desired beam length. Similarly, for other applications, the centerpoint may readily be determined.

Accordingly, it is one object of the invention to provide a measuring device for quick determination of the center of a linear distance. Other objects and advantages of the present invention will be apparent from the following description of a preferred embodiment thereof and from the attached drawings.

DETAILED DESCRIPTION OF THE INVENTION

Figure 2:
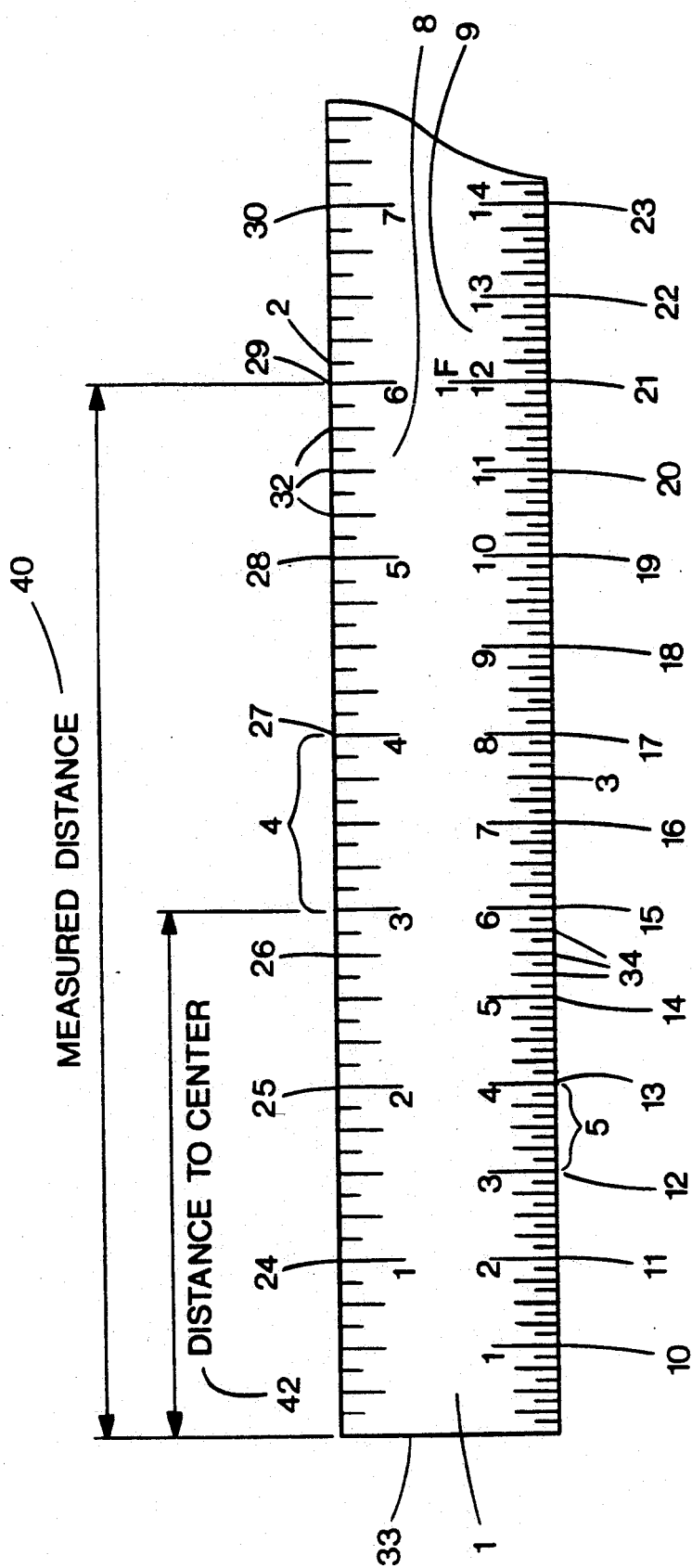
FIG. 2 is a fragmentary top plan view of one form of measuring tape embodying the invention.

Referring more specifically to the drawings, the illustrated embodiment of the invention is a measuring tape consisting of a flat, flexible elongated tape 1. The tape 1 may be manufactured from plastic coated cloth or metal, though any material capable of being formed into the required shape and form of tape is acceptable. The tape may be of the type which is retracted, e.g., by a spring, into a housing 36 (FIG. 2). Such a tape typically has a conventional locking mechanism operated by a button 38 for selectively locking the tape in an extended position. The tape also has a lip or flange 40 for engaging a work piece or other object being measured. On one side of the tape along the top and bottom edges 2 and 3 (FIG. 2) are imprinted a full scale 8 and a half scale 9, respectively. Each scale 8, 9 begins at zero and ascends according to the units thereof from a common starting end 33 of the tape toward the opposite end of the tape.

Each scale 8, 9 includes numerically labelled markings or indicia (e.g., indicia 10-23 for scale 9 and 24-30 for scale 8). Each primary indicia typically includes a line-mark and a number-mark. The line-marks are placed normal to and extending to an edge 2 or 3 of the tape 1. The number-mark or label is an ordinal number corresponding to the indicia's position in the ascending scale.

The illustrated unit of the full scale 8 along edge 2 is the English system inch according to common convention. Naturally, in other embodiments of the invention, a different full scale unit may be chosen, for example, one centimeter in the metric system. The unit of the half scale 9 along edge 3 is exactly half the unit of the full scale In this case, the half scale unit is the half inch. In the illustrated embodiment of the present invention, the unit of the half scale is exactly one-half the full scale unit and the distance 5 between each primary indicia of the half scale 9 is exactly one-half of the distance 4 between each primary indicia of the full scale 8.

Subdivisional or secondary markings of the scales, such as the subdivisional markings 32 on scale 8 that further divide the interval between indicia 28 and 29 and markings 34 on scale 9 that further divides the interval between indicia 14 and 15 are also included in the illustrated embodiment of the invention to increase the measuring accuracy of the device. However, they are not necessary to all realizations of the present invention. The subdivision markings may be provided at any suitable spacing, such as to the 1/16th inch spacing on the full scale.

The preferred embodiment of the invention also may include means for visually differentiation between the full scale and the half scale. The differentiation may be accomplished through increasing the size of the indicia of the full scale 8 in comparison to the size of the half scale 9, or by using a different color for one of the scales. However, the two scales may also be differentiated in any other manner consistent with the purposes of the present invention.

Figure 1:
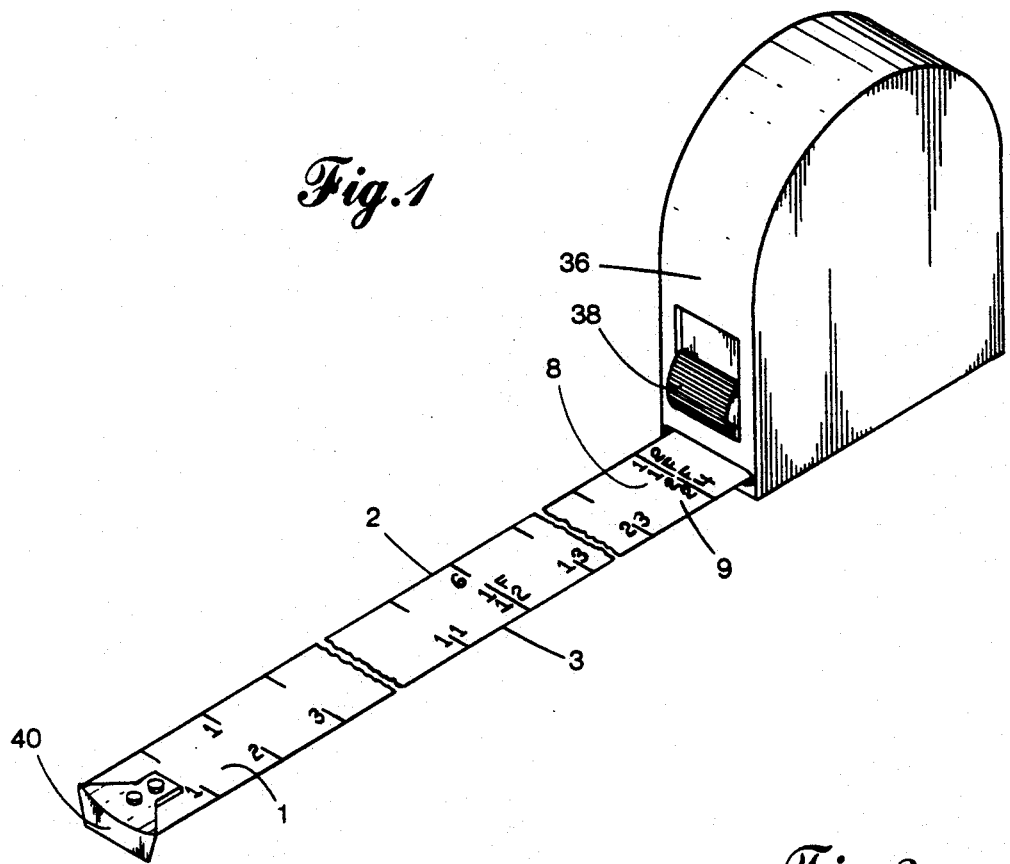
FIG. 1 is a tape measure in accordance with the present invention with only a portion of the indicia for first and second scales being shown thereon.
Figure 3:
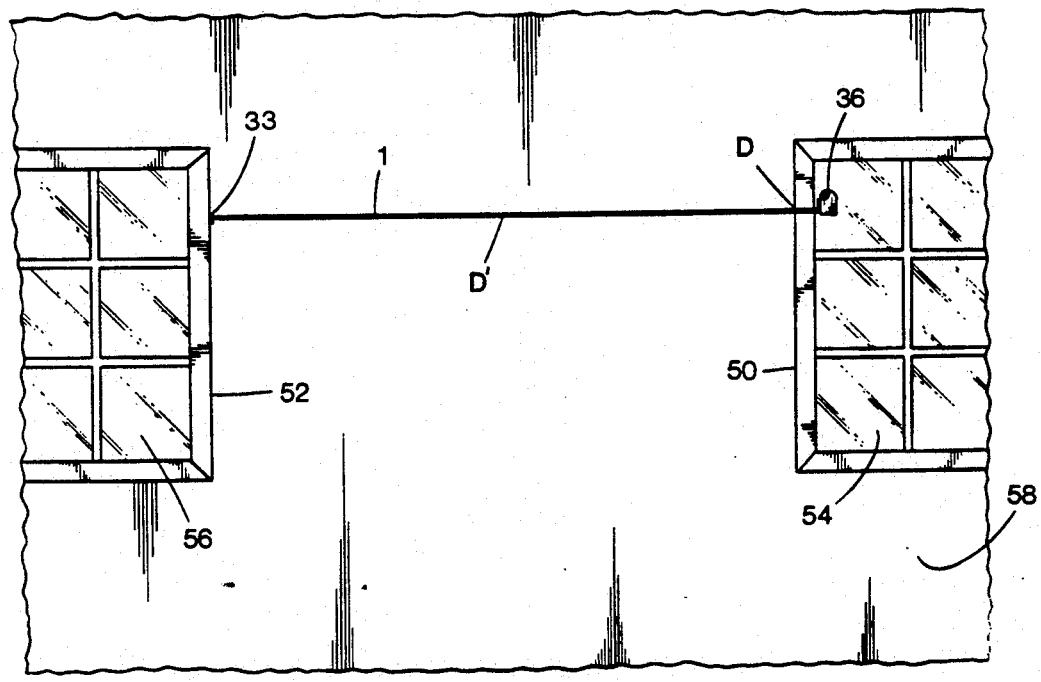
FIG. 3 is a schematic representation of a portion of a room which illustrates the use of the invention in locating the centerpoint between two windows in a wall of the room.

FIG. 2 and FIG. 3 are provided to demonstrate a method of determining the centerpoint of a distance using the invention. To use the invention, the user simply lays the full scale edge 2 of the device along the distance to be measured. For example, assume the full scale measured distance is six inches as indicated by number 40 in FIG. 2. The full scale indicia corresponding to this distance is the indicia 29, that is the number-mark "6". In this case, the centerpoint would be three inches, indicated by number 42 in FIG. 2. However, the user of the tape need not divide six by two to find the center point. Instead, the user need only locate the indicia on the half-scale (indicia 15 or the number-mark "6") corresponding to the indicia on the full scale as the location of this half-scale indicia identifies the centerpoint of the full scale measurement. Obviously, the determination of the centerpoint becomes more complex and the benefits of the invention more apparent as the full scale measurement deviates from an integer number-mark indicia.

As another example, assume it is desired to locate and hang a picture at the centerpoint between the proximate vertical edges 50, 52 of a pair of windows 54, 56 in a wall 58 of a room. In this case, the beginning end 33 of the tape is placed against one of the vertical edges (e.g., edge 52) and the tape is extended to the other vertical edge. The indicia corresponding to the distance D between these vertical edges 50, 52 is located on the full scale. This same indicia is then located on the half scale edge of the tape and will be at a distance D' which is one-half of the distance D. In this manner, the centerpoint between the windows is located and a picture may be hung at such location.

Having illustrated and described the principles of the invention in a preferred embodiment, it should be apparent to those skilled in the art that the invention can be modified in arrangement and detail without departing from such principles. We claim all modifications coming within the spirit and scope of the following claims.

I claim:

1. A method of locating the center of a distance measured between first and second points comprising:

extending a flexible tape having first and second side edges and a first end edge to position the first end edge of the tape at the first point and a portion of the tape spaced from the first end edge at least to the second point;

reading a first distance indicia at the second point from a full scale at a first side edge of the tape to measure the distance between the first and second points, the full scale ascending from the first end edge;

reading a second distance indicia from a one-half scale at the second side edge of the tape, the one-half scale ascending from the first end edge of the tape, the second distance indicia being at a third point between the first and second points and corresponding to the first distance indicia but the third point being at a distance from the first end edge which is one-half of the distance between the first and second points; and retracting the flexible tape.

2. A method according to claim 1 in which the two points are on the wall of a room, and the method includes the step of extending the tape along the wall by positioning the first end edge of the tape at the first point on the wall and positioning a portion of the tape spaced from the first end edge at least to the second point on the wall.

3. A method according to claim 1 in which the extending step comprises the step of extending the flexible tape outwardly from a housing and wherein the retracting step comprises the step of retracting the extended flexible tape into the housing.

4. A method according to claim 1 in which the reading steps comprise reading corresponding first and second distance indicia which are of the same numerical value.

5. A method according to claim 1 in which the reading steps comprise reading and identifying numerical visual indicia which are the same.

6. A method according to claim 1 in which the reading steps comprise respectively reading from continuously ascending full and one-half scales.

* * * * *